United States Patent [19]

Mayfield

[11] 3,875,817

[45] Apr. 8, 1975

[54] GEAR DRIVE WITH ROTATING STUD TEETH

[76] Inventor: Samuel D. Mayfield, Box 146, Clayton, N. Mex. 88415

[22] Filed: Aug. 20, 1973

[21] Appl. No.: 389,966

[52] U.S. Cl................................. 74/465; 74/425
[51] Int. Cl......................... F16h 1/16; F16h 55/06
[58] Field of Search..................... 74/464, 465, 425

[56] References Cited
UNITED STATES PATENTS

| 874,342 | 12/1907 | Janson | 74/464 |
|---|---|---|---|
| 3,181,378 | 5/1965 | Petroff | 74/465 X |
| 3,648,535 | 3/1972 | Maroth | 74/465 |

FOREIGN PATENTS OR APPLICATIONS

| 220,032 | 8/1924 | United Kingdom | 74/465 |

*Primary Examiner*—Leonard H. Gerin
*Attorney, Agent, or Firm*—Peter J. Murphy

[57] ABSTRACT

The worm gear component of a worm-worm gear drive includes rotating studs which define the teeth of the worm gear which are engaged by the worm threads. The studs are supported in recesses in the worm gear component, and include a ball thrust bearing at the base of the recess and roller load bearings at the mouth of the recess. An axial pin through the studs retains the studs in the carrier. The worm gear may have a single row of rotating studs arranged in a radial plane which passes through the axis of the worm. In an arrangement for transmitting larger torque, a peripheral surface of the worm gear is saddle-shaped to accommodate the periphery of the worm, and the saddle-shaped gear has a plurality of annular rows of rotating studs around its periphery for engagement by the worm threads, with the stud axis being generally perpendicular to the saddle surface.

11 Claims, 5 Drawing Figures

3,875,817

GEAR DRIVE WITH ROTATING STUD TEETH

BACKGROUND AND SUMMARY OF THE INVENTION

This invention relates to a worm-worm gear drive wherein the worm gear component carries rotating studs which define the teeth thereof for engagement by the worm threads. More particularly this invention relates to a worm-worm gear drive arrangement wherein a plurality of rotating studs carried on the worm gear are engaged simultaneously by one thread of the worm.

As is well known, a worm gear drive consisting of a worm gear component and one or more worm components has the inherent ability to produce a high mechanical advantage. It is also well known that the nature of tooth engagement in worm gearing causes greater sliding action between the surfaces in contact, than in the case of spur gearing, and that the amount of sliding action effects the efficiency of the gearing although it contributes to the smoothness of the drive. It is desirable therefore to provide a worm gear drive wherein the amount of sliding action is reduced to increase the efficiency of the gearing, without reducing the smoothness of the drive.

In worm gearing, the power-transmitting capacity is based upon the strength of the teeth and the ability to resist wear and abrasion; and generally the power-transmitting capacity is limited by the worm gear since the teeth of the worm gear are usually weaker than the threads on the worm. It is desirable then to provide a worm-worm gear assembly wherein the "teeth" of the worm gear are made sufficiently strong and have the ability to resist wear and abrasion such that the power-transmitting capacity of the assembly is maximized.

One object of this invention is to provide a worm-worm gear assembly wherein the teeth of the worm gear are formed by rotating studs and wherein the rotating studs and gear coact to provide maximum strength.

Another object of this invention is to provide a worm-worm gear assembly including a worm gear of novel design having rotating studs designed for high strength.

A further object of this invention is to provide a worm-worm gear assembly wherein the worm gear is provided with rotating studs which define the teeth thereof and in which a plurality of such rotating studs are engaged simultaneously by a single thread of the worm.

A still further object of this invention is to provide a worm-worm gear assembly in which the worm gear carries rotating studs defining teeth for engagement by a worm of "hour-glass" shape for improved efficiency.

These objects are accomplished in a worm gear comprising a carrier having a peripheral face and peripherally spaced recesses opening to the peripheral face. A plurality of rotating studs are supported in respective carrier recesses. Each of the studs comprises a cylindrical portion at one end, an intermediate conical portion diverging from the cylindrical portion, and a head at its other end configured for engagement with a worm thread. Each of the carrier recesses comprises an outer conical portion converging inwardly, and a cylindrical portion for accommodating a stud cylindrical portion with suitable clearance. The carrier conical portion and the stud conical portion define respective outer and inner races for roller bearings which rotationally support the stud in the recess, with the roller bearings being confined in a cage. Means are provided for retaining the studs in the respective carrier recesses.

More particularly, the studs are provided with ball thrust bearing means for resisting inward thrust of said studs. The carrier peripheral face may be saddle-shaped, with the stud recesses arranged in a plurality of annular rows and having their axes generally perpendicular to the saddle-shaped surface, with the studs further arranged in transverse rows projecting into the carrier saddle to define worm gear threads engaged by a coacting worm. One or more worms engaging the worm gear may have a coacting hour-glass shape.

The novel features and the advantages of the invention, as well as additional objects thereof, will be understood more fully from the following description when read in connection with the accompanying drawings.

DRAWINGS

Figure 4:
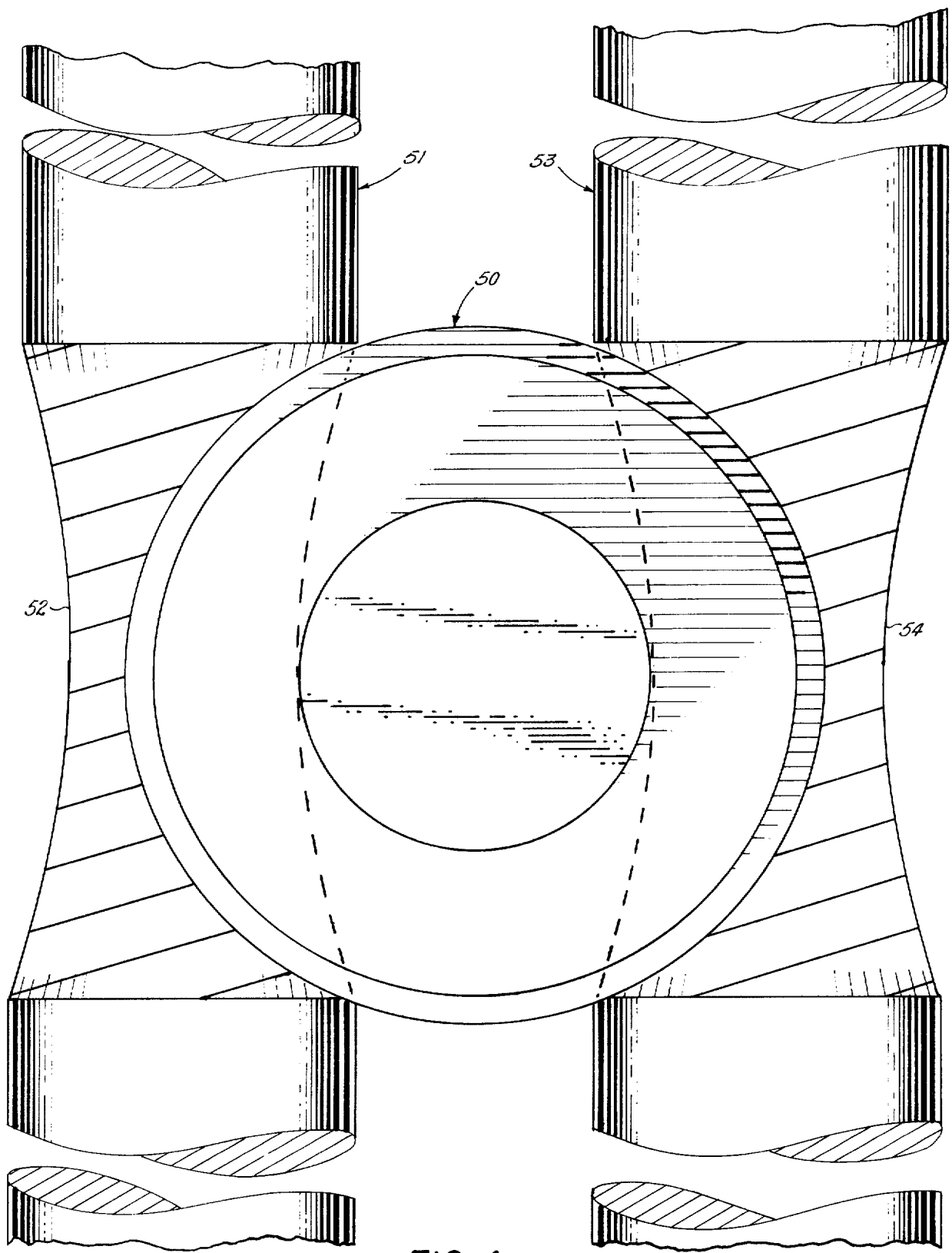
Figure 5:
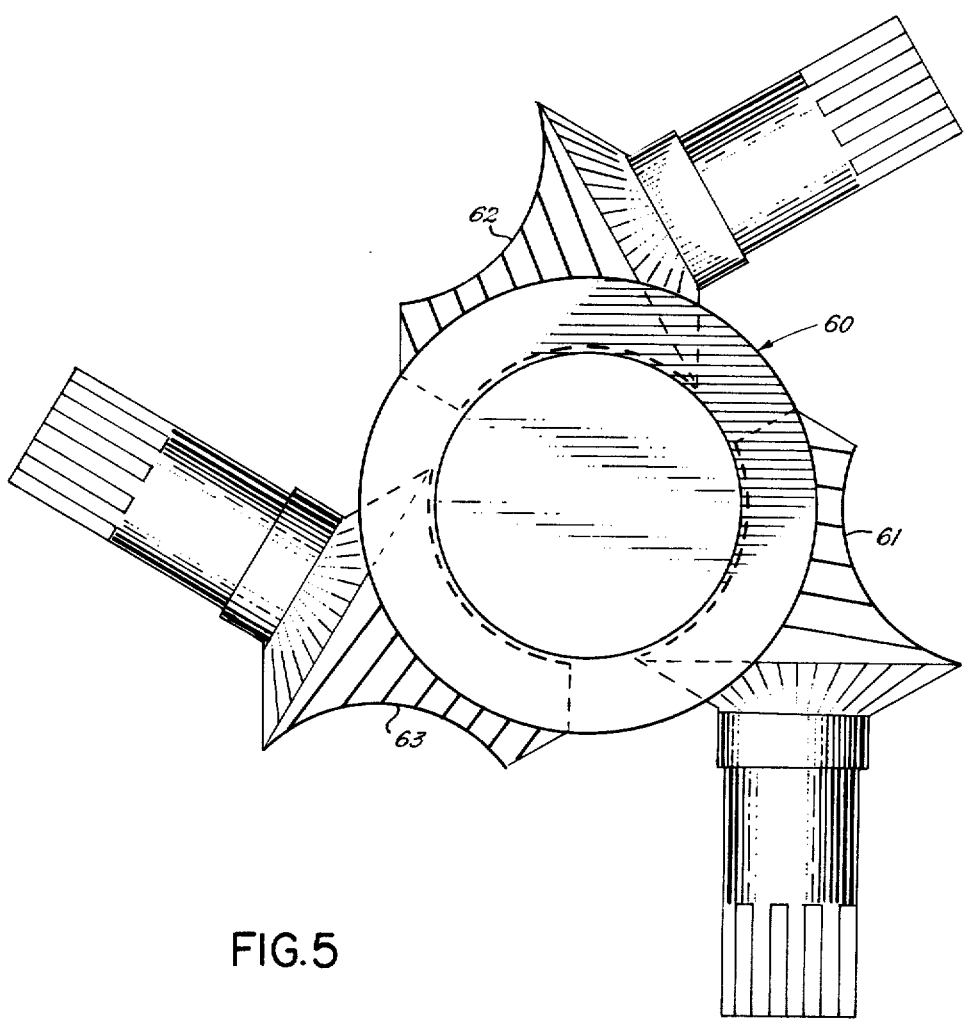

FIG. 4 is a diagrammatic view of a worm-worm gear assembly showing an end view of a worm gear having a saddle carrying a plurality of annular rows of rotating teeth which are engaged by a pair of parallel worms of "hour-glass" shape; and FIG. 5 is another diagrammatic view of a worm-worm gear assembly, showing an end view of a worm gear having a saddle carrying a plurality of annular rows of rotating studs, and three coacting drive worms having a one-half hour-glass shape.

DESCRIPTION OF THE PREFERRED EMBODIMENT

Figure 1:
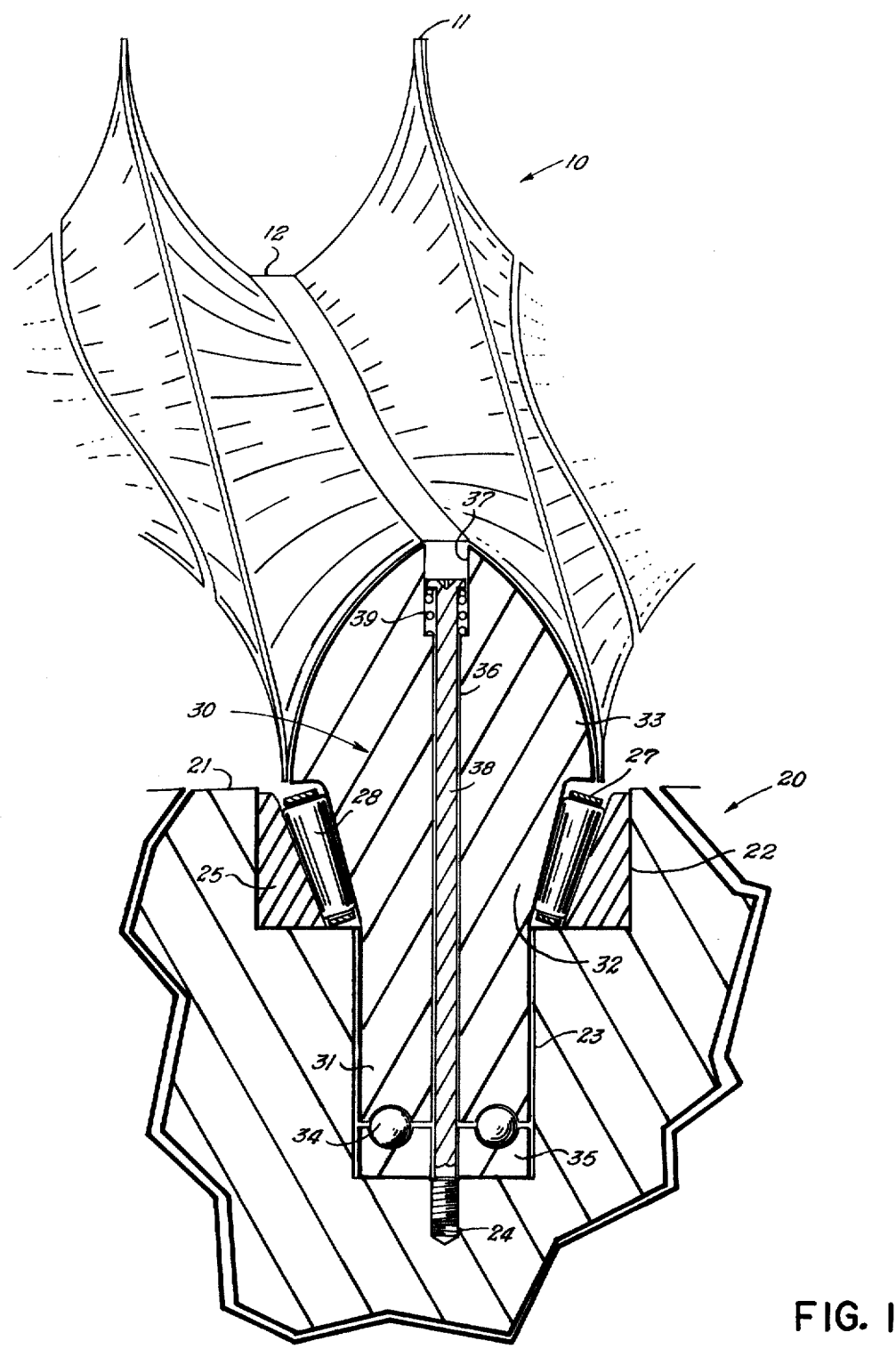
FIG. 1 is a fragmentary view of a worm-worm gear assembly, wherein a fragment of the worm is viewed from the side, and wherein a fragment of the worm gear including a rotatable stud is viewed in section taken in a radial plane of the worm gear which intersects the axis of the worm.

In the drawings, FIG. 1 is a fragmentary view of a worm-worm gear combination showing the coaction of the worm threads with a rotating stud of the worm gear. This figure includes a fragmentary side view of a cylindrical worm 10 with the threads being defined by a continuous land 11 and associated continuous groove 12. This figure includes a fragmentary sectional view of a worm gear 20 with the section being taken in a radial plane of the worm gear which intersects the rotational axis of a rotatable stud 30 and which also intersects the rotational axis of the worm 10.

The worm gear 20 includes a unitary carrier 21, that is a one piece carrier, which may also include an integral shaft, for example, or which may include a central bore and flange for mounting the carrier on a suitable shaft. The carrier has an annular peripheral surface 21 into which are formed a plurality of stepped recesses which include a large diameter cylindrical portion opening to the peripheral surface 21 and referred to as a counter bore 22, an intermediate cylindrical portion 23, and a small internally threaded portion 24, all of the portions being coaxial. An annular insert 25 is seated in the counter bore 22 and is provided with an internal conical face which, in assembled relation, is of larger diameter adjacent to the mouth of the stepped recess. This insert 25 is of a suitable material to define an outer race for a roller bearing assembly consisting of a cage 27 and a plurality of tapered roller bearings 28.

The stud 30 is an elongated member fabricated of a material of suitable strength and consists of a cylindrical portion 31 at one end, an intermediate conical portion 32 diverging outwardly from the cylindrical portion 31, and an enlarged head 33 having a rounded configuration for coacting with the shape of the worm groove 12. Of course, the worm groove 12 and the stud head 33 may have any desired coacting configuration suitable for the intended purpose. As shown, the stud conical portion 32 defines the inner race for the roller bearing assembly, with this roller bearing assembly carrying the principal load which is placed on the stud 30.

The stud 30 is also provided with a thrust bearing to resist axially inward directed forces. This thrust bearing is a ball bearing assembly with the free end of the stud cylindrical portion 31 defining an inner race for ball bearings 34, with a disk-shaped member 35 defining the outer race for the assembly. The outer race 35 has a diameter corresponding to the diameter of the stud cylindrical portion 31 and seats at the base of the carrier recess portion 23. The thrust bearing provides for precise axial positioning of the stud relative to the carrier and, should some adjustment be required, a race of smaller thickness could be employed or, if necessary, shims could be employed between the race and the base of the recess 23 to raise the stud.

For retaining the stud within the carrier, the stud and outer race are provided with an axial bore 36 and enlarged counter bore 37 at the head end. A retaining pin 38 includes an elongated shank dimensioned to be received within the bore 36 and being threaded at one end for threaded engagement with the threaded recess 24 of the carrier, with the pin having an enlarged head at the other end dimensioned to be received within the counter bore 37 and provided with a suitable screw driver slot. The retaining pin is dimensioned so that a compression spring 39 is confined between the head of the pin and the shoulder between the stud bore and counter bore. In this manner the stud is maintained seated on the base of the stepped recess by means of the spring force applied by the retaining pin and spring 39. With this relatively light retaining force, the stud is free to rotate as required under load. The cylindrical portion 23 of the recess provides sufficient clearance for free rotation of the stud.

In the assembly of FIG. 1, the worm gear would consist of a single peripheral row of studs 30, with the studs being positioned in a radial plane of the worm gear for coacting with a worm 10 having its rotational axis disposed in that radial plane.

Figure 3:
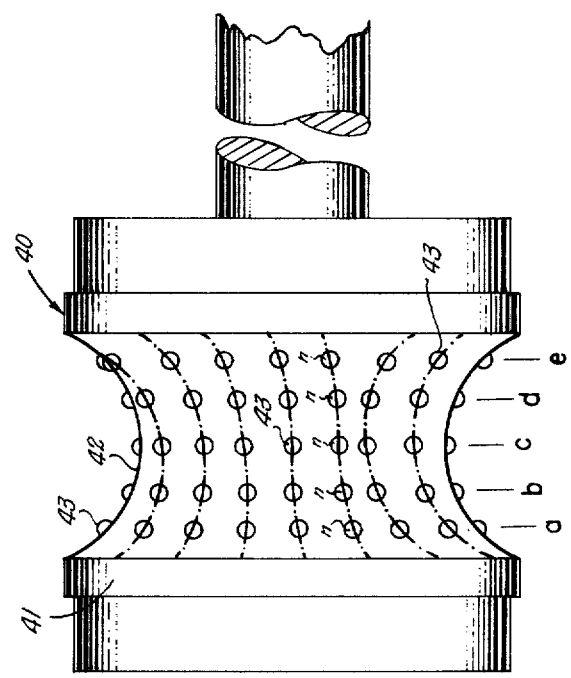
FIG. 3 is an edge view of a worm gear component having an annular curved face or "saddle" from which projects a plurality of rotating studs defining the worm gear teeth.

FIG. 3 is a diagrammatic view illustrating another form of worm gear 40, wherein the gear carrier 41 includes a saddle-shaped peripheral surface 42 having a plurality of rotating studs 43 supported in appropriate recesses in the carrier 41 and projecting from the saddle face 42 with the rotational axes of the studs being generally perpendicular to the saddle face 42 at the point of emergence. The number of studs 43 provided on the carrier would, of course, depend on the relative sizes of the worm gear 40 and a coacting worm. By way of example, the worm gear 40 includes five annular rows a, b, c, d and e, of studs 43, with the studs of the row c having their axes disposed in a radial plane of the carrier. Also, the studs are arranged in suitable transverse rows, such as a row of studs designated by the letter n with this row of studs defining the equivalent of an elongated tooth of a conventional worm gear. With this design of worm gear and an appropriately mated worm, tremendous power can be transmitted through this gear drive.

FIG. 4 is a diagrammatic view illustrating a single worm gear 50 and two driving worms 51 and 53 having respective threads 52 and 54 configured in an hour-glass shape. Such hour-glass shape of worm is illustrated in Whitney U.S. Pat. No. 626,515. The worm gear 50 is similar to the worm gear 40 of FIG. 3, having a saddle-shaped peripheral surface and studs arranged in a plurality of annular rows as described in connection with FIG. 3. With the hour-glass shape of the worm the capacity and efficiency of the worm-worm gear assembly is increased. In this assembly the two worms 51 and 53 are parallel to each other and are suitable coupled together to simultaneously drive the worm gear 50.

Figure 2:
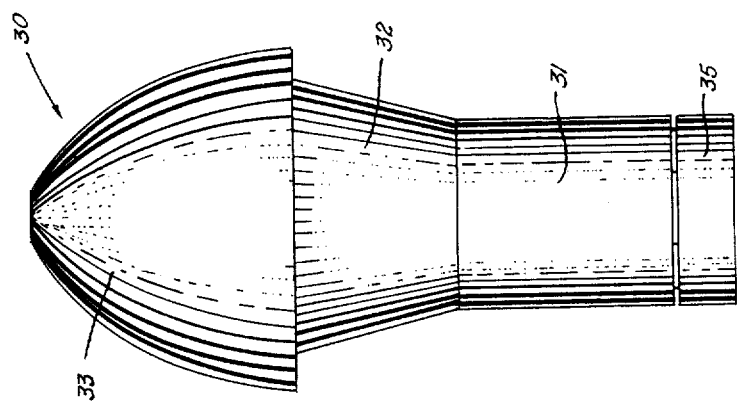
FIG. 2 is an elevation view of the rotatable stud of FIG. 1.

FIG. 5 is another diagrammatic view of a worm worm-gear assembly including a worm gear 60 having a configuration similar to that described in connection with FIGS. 2 and 3, and which is driven by three worms 61, 62 and 63, each worm having a one-half hour-glass shape. In the illustrated assembly, the rotational axis of the three worms are disposed at 60 degrees relative to each other with the three worms acting on equally spaced portions of the worm gear. Of course, the three worms are suitable coupled together for simultaneously driving the worm gear 60.

What has been described is a unique worm-worm gear assembly having the capability of transmitting very large loads.

A particular feature of the invention is the configuration of the worm gear and the manner of mounting the studs such that the worm gear may be a unitary member for maximum strength. Depending on the size of the worm gear, the worm gear carrier may support as many studs as is desired for transmitting the necessary load.

Another feature of the invention is the manner of mounting the studs in the carrier with the load being principally carried by a roller bearing assembly, and with a thrust bearing assembly for precise axial positioning of the studs relative to the carrier, and a retaining means for the studs enabling the use of a unitary carrier.

A further feature of the invention is the provision of a worm gear having a saddle-shaped peripheral surface carrying a plurality of annular rows of rotating studs defining curved teeth of the worm gear, for coaction with either a cylindrical worm or a worm having an hour-glass shape.

While preferred embodiments of the invention have been illustrated and described, it will be understood by those skilled in the art that changes and modifications may be resorted to without departing from the spirit and scope of the invention.

What is claimed is:

1. A worm gear comprising
   a unitary carrier, fabricated from a single piece of material, having a peripheral face and peripherally spaced recesses opening to said peripheral face;

a plurality of rotating studs, each rotatably supported in a carrier recess;

each of said studs being fabricated from a single piece of material and comprising a cylindrical portion at one end, an intermediate conical portion diverging from said cylindrical portion, and a head at its other end configured for engagement with a worm thread;

each of said carrier recesses comprising an outer conical portion converging inwardly, and a cylindrical portion for accommodating a stud cylindrical portion with suitable clearance;

said carrier conical portion and said stud conical portion defining respective outer and inner races for roller bearings rotationally supporting said stud in said recess;

and means disposed axially of said studs for retaining said studs in respective carrier recesses.

2. A worm gear as set forth in claim 1
said roller bearings being tapered roller bearings with the larger ends thereof being disposed adjacent to the mounths of said carrier recesses.

3. A worm gear as set forth in claim 1
said carrier recesses including enlarged outer cylindrical counter bores; and a bearing insert received in each of said counter bores defining said outer races for said roller bearings.

4. A worm gear as set forth in claim 1
the end face of each stud cylindrical end portion providing a race for a ball bearings defining a thrust bearing; an outer thrust bearing race having a diameter corresponding to said stud cylindrical end portion; and said outer thrust bearing race being configured to seat at the base of said recess cylindrical portion.

5. A worm gear as set forth in claim 1
each stud being provided with an axial bore having a larger counter bore at its head end; each carrier recess being provided with a small axial threaded recess at the base thereof; said stud retaining means comprising an elongated retainer pin extending through said stud bore, having a head at one end for seating in said stud counter bore, and being threaded at its other end for engagement in said threaded recess.

6. A worm gear comprising a unitary carrier, fabricated from a single piece of material, having a peripheral saddle-shaped face, and having peripherally spaced recesses arranged in a plurality of transverse rows, and said recesses opening to said peripheral face with their axes disposed transverse thereto;

a plurality of rotating studs each rotatably supported in a carrier recess; said recesses and studs being arranged in transverse rows across said peripheral face with said studs projecting into said carrier saddle to define worm gear threads for engagement by a coacting worm;

each of said studs being fabricated from a single piece of material and comprising a head defining the stud portion projecting from said carrier, and an adjacent journal portion;

each of said carrier recesses comprising an outer bearing portion; said recess bearing portion and said stud journal portion defining respective outer and inner races for roller bearings rotationally supporting said stud in said recess;

and means for retaining said studs in respective carrier recesses.

7. A worm gear as set forth in claim 6
in combination with a worm having an hour-glass shape engaging said studs.

8. A worm gear as set forth in claim 6
in combination with two worms each having an hour-glass shape; said worms being disposed in parallel relation to each other and engaging said gear studs on opposite sides of said carrier.

9. A worm gear as set forth in claim 6
in combination with a plurality of worms, each having a partial hour-glass shape; said worms being disposed to engage said gear studs at different peripheral areas of said carrier.

10. A worm gear as set forth in claim 6
said carrier recesses including enlarged outer cylindrical counterbores; and a bearing insert received in each of said counterbores defining said outer races for said roller bearings.

11. A worm gear as set forth in claim 6
thrust bearing means disposed between the inner ends of each of said studs and its respective carrier recess.

* * * * *